United States Patent Office 3,477,814
Patented Nov. 11, 1969

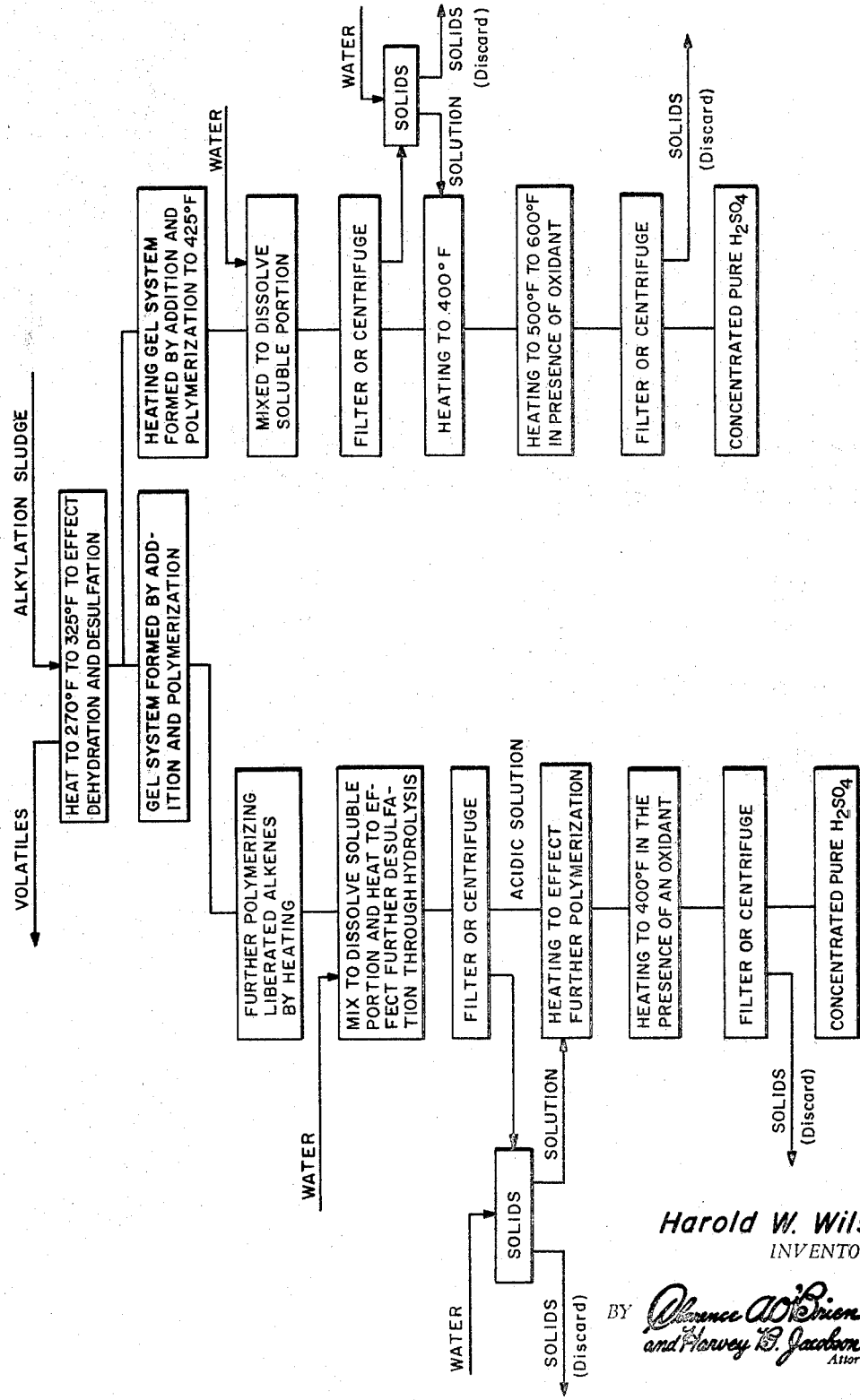

3,477,814
PROCESS FOR THE TREATMENT OF ALKYLATION REFINING SLUDGES TO RECOVER SULFURIC ACID
Harold W. Wilson, P.O. Box 9851,
El Paso, Tex. 79989
Filed Mar. 23, 1966, Ser. No. 536,866
Int. Cl. C01b *17/90;* C10g *17/02*
U.S. Cl. 23—173                                    4 Claims

ABSTRACT OF THE DISCLOSURE

A process for the recovery of substantially organic matter-free sulfuric acid from alkylation sludges resulting from the use of sulfuric acid in a hydrocarbon refining process which comprises heating the liquid sludge at atmospheric pressure to a temperature below a charring temperature, holding the sludge at such temperature until the liquid becomes "polymerized" with attendant production of a soft, solid gelatinous mass holding entrapped uncombined sulfuric acid therein, heating the gelatinous mass at a temperature generally above that utilized to bring about gelation to effect further polymerization of the organic matter present, diluting and mixing the so-treated gelatinous mass with water, separating the acid insoluble-acid unreactable portions of the aqueous system from the sulfuric acid and simultaneously concentrating and further purifying the recovered acid by heating in the presence of an oxidant.

---

This invention relates to a process for the treatment of alkylation refining sludges and more particularly to a process for producing a substantially pure grade of organic-matter-free sulfuric acid from the alkylation sludges which contain sulfuric acid and contaminants comprising unwanted organic matter produced during the petroleum refining and absorbed by concentrated sulfuric acid.

Most methods proposed heretofore for the recovery of sulfuric acid from alkylation sludges generally embody one or more of the following principles: thermo splitting, complete combustion, hydrolysis and concentration, solvent removal of organic matter, freezing, and dialysis. Most generally the methods known heretofore center about hydrolysis. Whereas the present invention initially removes as much water as possible so as to promote polymerization and desiccative action of the sulfuric acid on the unwanted organic contaminants. Moreover, subsequent steps utilize a combination of heat and hydrolytic action coupled with polymerization, pyrolysis and desulfation. Furthermore as will become more apparent hereinafter the process of the present invention centers about polymerization reactions.

More specifically, the process of the present invention is based on the use of controlled heating of alkylation sludges to bring about dehydration of the system through the combined agencies of heat and desiccation by the sulfuric acid of the system to result in the reactions of desulfation, addition, and polymerization whereby a resultant system is created which is composed principally of free, uncombined sulfuric acid and polymerized sulfuric acid-insoluble and acid-unreactable organic and inorganic matter of such a physical condition that it may be quickly, easily, and simply separated from the sulfuric acid in which it is contained, and as will become apparent from the following discussion provides a process totally different and superior to those known heretofore.

Accordingly, it is a principal object of this invention to provide a process for the treatment of alkylation refining sludges to recover a substantially pure grade of organic-matter-free sulfuric acid therefrom.

Another object of the present invention is to provide a novel process for the recovery of substantially pure sulfuric acid from alkylation refining sludges by utilization of controlled heating to bring about dehydration as well as desiccation of the system by the sulfuric acid with the resultant reactions of desulfation, addition, and polymerization so as to permit separate recovery of uncombined sulfuric acid and polymerized sulfuric acid-insoluble and acid-unreactable organic and inorganic matter.

These and other objects are accomplished by the process shown schematically in the drawing accompanying this application which illustrates various alternatives in the process constituting this invention.

A waste or spent form of sulfuric acid known as alkylation sludge is obtained as a waste product from the manufacture of alkylation gasoline wherein sulfuric acid of a concentration of approximately 98% to 100% $H_2SO_4$ is employed for the primary purpose of absorbing specific types of unwanted organic matter produced during the petroleum refining operations. A general description of alkylation sludges amenable to treatment for recovery of their sulfuric acid content as $H_2SO_4$ by use of the process of the present invention are liquid materials of high sulfuric acid content ranging between 80% and 91% $H_2SO_4$, with a relatively low water content ranging between 4% and 10%, having a low organic matter content ranging between 5% and 10%, and having a relatively low viscosity.

Briefly, in the practice of the present invention the alkylation sludge to be treated is heated until the liquid sludge becomes a solid gelatinous mass. After the gel has formed alternative steps may be employed to effect desulfation and polymerization of the organic matter. In one procedure the maximum degree of polymerziation is achieved rapidly at the expense of a somewhat smaller recovery of sulfuric acid as a result of greater losses of $SO_2$, whereas by use of the slower second procedure a higher recovery of sulfuric acid from the sludge is achieved.

More specifically, the alkylation sludge to be treated is placed in a suitable container having a capacity of approximately twice that of the volume of sludge to be treated. The sludge is heated in any suitable manner to a temperature ranging between 270° F. and 325° F. and preferably between 290° F. and 300° F. A temperature as low as approximately 270° F. will generally achieve gelation, but as a practical matter excessive time requirements preclude the use of temperatures below 270° F. Moreover, it is generally advisable not to heat the sludge above a temperature of approximately 325° F. The sludge is held in this temperature range until the liquid becomes a solid gelatinous mass. During this heating period most of any uncombined, volatile organic matter present, predominantly hydrocarbons, and a major portion of the free water of the system leave in the vapor state. As the temperature rises towards the 325° F. upper limit, entrapped sulfur dioxide in combination with released water vapor and uncombined, volatile organic matter leaving the system cause an approximate doubling of the volume of the sludge. The point of gel formation, when it occurs, is generally coincident with the point at which release of gases and vapors reach a maximum and they escape from the system while the foam they had produced collapses allowing an instaneous reduction of the volume. The more slowly the system is initially heated and the closer the heating temperature approximates 300° F. the more constant is the release of the gases and vapors. Thus less foaming takes place and only a small volume increase will occur.

After the gel has formed at least two alternative procedures may be employed for the recovery of the sulfuric acid. In one procedure, as soon as the gel has formed the temperature is increased such that the system becomes heated to a temperature of approximately 425° F. at which temperature it is held for a time period of two to three times after which is added to it a volume of water approximately equal to the volume of the original alkylation sludge treated.

The gel and water are then intimately mixed and the resultant solution containing insoluble organic and inorganic matter are separated such as by filtering or centrifuging so as to remove the particles present. Entrained aqueous acid matter in the insoluble material is removed by washing with a small amount of water and such washings are combined with the previously recovered solubles from the system. The solubles portion, after being treated to a temperature of approximately 400° F. to 425° F., to eliminate a major portion of the water present, is treated with a small amount of an oxidant such as nitric acid, hydrogen peroxide, perchloric acid, hypochlorous acid, or the like, in order to effect oxidation of residual aqueous-acid soluble organic matter that may be present along with small amounts of sulfurous acid.

This acid system is then heated to temperatures ranging between 570° F. and 600° F., after which it is cooled and passed through suitable filtration equipment to yield an end product of sulfuric acid substantially free of organic or inorgnic contaminants, concentrated sulfuric acid-insoluble inorganic sulfates, and any silica that may have been originally present in the sludge. The recovered substantially pure sulfuric acid end product derived from this procedure will generally have a concentration between approximately 95% and 97% $H_2SO_4$ depending upon the final heating temperature employed.

In an alternative procedure the system is heated, after the gel has formed as described heretofore, for an additional time period of approximately ten to fifteen minutes at the upper temperature limit of approximately 325° F. at which point the gel has become a relatively rigid mass exhibiting all the characteristics of a true gel.

This gel is intimately mixed with an amount of water approximately equivalent to one-half to a whole part by weight of the original alkylation sludge used. The resultant system containing both liquid and insoluble solids is separated by suitable means such as filtration or centrifuging, for example. Unseparated liquids entrained by the insoluble solid material are displaced by treating, or washing, the insoluble solid material with small amounts of water, which resultant liquid is combined with the previously recovered liquid. This solution is then heated to a temperature of approximately 400° F. During the heating as the concentration of sulfuric acid approaches 70%–75% a slight foaming will occur which can be eliminated for example by playing a very light stream of air upon the surface of the solution.

This hot solution is combined with a volume of water equal to approximately one-half the volume of the acid solution. This solution is predominantly sulfuric acid and water and contains a very small quantity of insoluble solid organic substance which are separated such as by filtering or centrifuging to obtain a clear solution which is practically free of all organic matter previously present in the spent alkylation sludge.

The solution obtained above is heated at approximately 400° F. until free of any odors caused by minute amounts of soluble volatile organic compounds still present. The small amount of an oxidant such as nitric acid, hydrogen peroxide, perchloric acid, hypochlorous acid, or the like is then introduced and the solution further heated to a temperature of approximately 450° F. Heating prior to adding the oxidant effects removal of water as well as any volatile organic substances which would consume oxidants if not first removed. At the same time the sulfuric acid concentration is increased until the final system can be made to contain $H_2SO_4$ content anywhere in the range between approximately 85% to 97% as desired and be entirely free of organic matter. Heavy metals such as lead, the alkaline earth metals such as calcium, the tervalent metals such as iron and aluminum, and silica separate out of the resultant concentrated sulfuric acid as sulfuric acid insoluble sulfates and silica, should such elements and/or silica be present in the alkylation sludge being treated.

Although the exact quality and quantity of organic matter present in alkylation sludges varies widely depending upon the nature of the crude petroleum treated and the specific type of refining processes employed, essentially these sludges contain qualitatively some uncombined alkane hydrocarbons, oxygenated and sulfated derivatives of alkene hydrocarbons, and some partially polymerized hydrocarbons.

By the use of controlled, relatively low temperature heating of alkylation sludges in the first step of this process, prior to the formation of the gel state, uncombined hydrocarbons and other volatile organic substances along with water and some sulfur dioxide are removed while a minimum degree of pyrolysis and reduction of sulfuric acid to sulfur dioxide occurs. Coincident with removal of the water the desiccative action of the sulfuric acid is increased to enhance the formation of polymers by alkene hydrocarbons produced from the desulfation of the alkyl hydrogen sulfates present in the system as illustrated below:

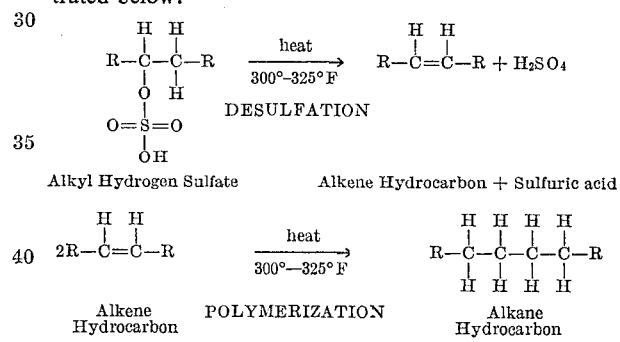

In the second alternate procedure of the process described hereinbefore, i.e. where heating is continued after formation of the gel, further polymerization of liberated alkenes occur where their free bonds unite with other molecules and oxygen to form long chain and ring polymers. In addition, with increasing dessiccative action of the sulfuric acid with practically complete elimination of ionization and the presence of $HSO_4^{-1}$ ions, some alkyl hydrogen sulfates are converted into dialkyl hydrogen sulfates with liberation of even more bound sulfuric acid as shown below:

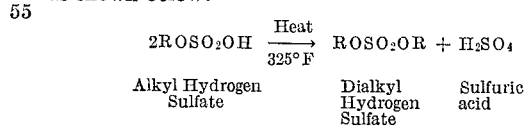

And, also, some alkyl hydrogen sulfates reacting with residual alcohols present in the system form ethers and liberate additional sulfuric acid as follows:

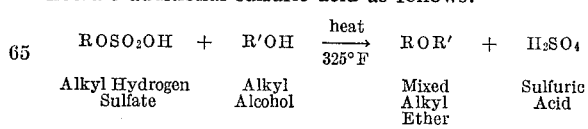

In brief, the use of the prescribed temperature and time of the disclosed process permits optimum conditions for achievement of the maximum liberation of organically combined sulfuric acid along with the formation of polymerized hydrocarbons and other acid-water insoluble organic derivatives through the agencies of desulfation polymerization, desiccation, dehydration, and deionization which in turn permits an easy separation of the wanted sulfuric acid from the unwanted organic matter.

In the next step of the process where the gel is combined with water, additional desulfation of non-desulfated alkyl hydrogen sulfates present is made to take place through hydrolysis as noted below:

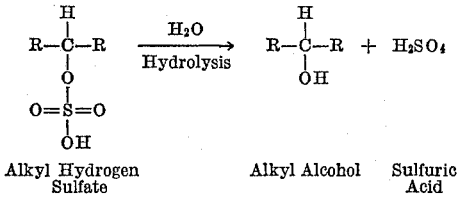

At the same time, the heat of dilution and the reduction of concentration of sulfuric acid present in the resulting aqueous solution minimizes reformation of any alkyl hydrogen sulfates, while volatile alcohols, acids, esters, ethers, and mercaptans are partially removed from the system with water vapor generated during the addition of water to the gel system.

In the next step of the process, where the aqueous sulfuric acid solution, after having been separated from the insoluble organic matter, is heated, such heating accomplishes further desulfation and continues in the removal of the volatile alcohols, acids, etc. noted above. Also, as the sulfuric acid concentration increases, dehydration and polymerization of the desulfated, nonvolatile organic compounds still present in the system is brought about.

In the final step of the process, after which the aqueous acid solution has been freed of practically all organic matter by physical and chemical separations and reactions, residual amounts of any organic matter still remaining are eliminated by first volatilizing any volatile acids, alcohols, esters, ethers, and mercaptans that may be present and finally by introducing a small amount of an oxidant, such as nitric acid, hydrogen peroxide, or the like any remaining organic matter present in the system will be removed. By continuing to heat the system after the oxidant has been added, complete oxidation and removal of oxidizable matter is assured, while at the same time the sulfuric acid content is increased by elimination of the water in the system and with its increase, inorganic sulfates and any silica, if present, are precipitated out of solution.

With further regard to the various temperature ranges set forth heretofore, in the heating of the alkylation sludges the temperature range between 300° F. and 325° F. was found to be optimum to minimize foaming and require minimum attention. As indicated heretofore, use of slightly lower temperatures produced desired end results, but consumed uneconomical amounts of time. On the other hand, the use of the initial heating temperatures in excess of approximately 325° F. cause uncontrollable foaming as well as an accelerated decomposition of sulfuric acid into reduced sulfur dioxide and consequent loss of recoverable $H_2SO_4$. In the near absence of water the optimum temperature for desulfation of alkyl hydrogen sulfates into alkenes and $H_2SO_4$ and the polymerization of alkenes into alkanes was found to be about 320° F., while in the presence of water the optimum temperatures for desulfation, addition, and polymerization reactions to occur were found to range between 400° F. and 450° F. Furthermore, the optimum temperature for desulfation of alkyl hydrogen sulfates into alcohols and sulfuric acid in an aqueous solution of approximately 50% to 60% sulfuric acid concentration was found to be about 220° F.

The following examples are included to specifically illustrate the practice of the present invention.

EXAMPLE I 100 grams of alkylation sludge having the following general composition, 87.5% $H_2SO_4$, 3.20% $H_2O$, 2.7% uncombined hydrocarbon, 0.2% $SO_2$, and 6.4% combined organic matter were weighed into a 400 ml. glass beaker. The sludge was heated to a temperature of 300° F. and after 14 minutes of heating became a semi-solid gel. The heat input was increased until the sludge had attained a temperature of 425° F. which required 13 minutes of time. The sludge was held at the temperature of 425° F. for three minutes after which 50 ml. of water were added to it and the system was intimately mixed. The resultant solution was filtered and the insoluble solid material on the filter was washed with two 25 ml. portions of water. The filtrate and washings combined were heated to a temperature of 400° F. at which point one ml. of 70% nitric acid (Sp. G. 1.42) in 4 ml. of water were added and the solution further heated to a temperature of 570° F. after which it was cooled and filtered. The weight of recovered product was 67.2 grams and had a sulfuric acid content ($H_2SO_4$) of 95.1% which is equal to a recovery of 73.0% of the acid present in the sample processed.

EXAMPLE II 100 grams of alkylation sludge having the following general composition, 83.7% $H_2SO_4$, 6.2% $H_2O$, 3.7% uncombined hydrocarbon, 0.4% $SO_2$, and 6.0% combined organic matter were weighed into a 400 ml. beaker. The sludge was slowly heated to a temperature of 310° F. and after 14 minutes of heating a solid gel formed. After eight minutes of additional heating at 320° F. the gel was combined with 50 ml. of water and after intimately mixing was centrifuged. The insoluble residue was washed with 50 ml. of water and the washings separated and combined with the previously obtained concentrate. This solution was heated to 385° F. temperature and then poured into 25 ml. of room temperature water. The resultant mix was filtered and the filtrate that was obtained was heated to 400° F. temperature at which point 2 cc. of a 15% aqueous solution of hydrogen peroxide were added to the hot solution. The solution was heated further to a temperature of 540° F. then cooled and weighed. The weight of recovered acid product was 73.6 grams and analysis showed it to be 93.2% $H_2SO_4$ which is equal to a recovery of 81.9% of the acid present in the sample processed.

EXAMPLE III 500 grams of alkylation acid sludge having the following general composition, 88.2% $H_2SO_4$, 2.35% $H_2O$, 3.1% uncombined organic hydrocarbon content, 4.9% combined organic matter were weighed into a liter beaker. The sludge was heated to a temperature of 270° F. and after eighty-two (82) minutes of heating it became a semisolid gel which was divided into two equal parts by weight with one of the two parts being transferred into a second liter beaker. One of the two parts, Part A was heated to a temperature of 325° F. and held at this temperature for ten minutes after which it was combined with 225 ml. of water and after intimate mixing of the water and the gel the mixture was filtered. The insoluble residue was washed with two 100 ml. portions of water and the washings separated and combined with the previously obtained filtrate to give Filtrate A. The second of the two portions of gel, Part B was heated to a temperature of 425° F. and held at this temperature for two minutes after which it was combined with 225 ml. of ambient temperature water and after intimate mixing it was filtered. The insoluble residue was washed with two 100 ml. portions of water and the washings separated and combined with the previously obtained filtrate to give Filtrate B.

Filtrate A was heated to a temperature of 450° F., then diluted with 125 ml. of ambient temperature water and the insoluble matter removed by filtering. The recovered filtrate was heated to 400° F. then, after being cooled to ambient temperature was treated with 5 ml. of a 1:1 nitric acid solution (1 part 70% $HNO_3$, sp. g. 1.42 and 1 part H₂O) and reheated to a temperature of 570° F. after which it was cooled and filtered to give a product weighing 194.3 grams with an analysis of this product showing a sulfuric acid content of 94.9% representing a recovery of 83.6% of the sulfuric acid contained in 225 grams of the original sludge treated.

Filtrate B was heated to a temperature of 450° F., cooled to 300° F. treated with 5 ml. of the nitric acid solution noted above, heated to 590° F., cooled, and after being filtered gave an end product weighing 186.2 grams with analysis of the product showing a sulfuric acid content of 95.4% $H_2SO_4$ representing a recovery of 80.5% of the sulfuric acid contained in 225 grams of the original sludge treated.

EXAMPLE IV 500 gram sample of the sludge of the general composition as noted in Example III was heated in a liter beaker to a temperature of 325° F. and after eleven minutes of heating it became a semisolid gel. The gel was divided into two equal parts in the same manner as was done in Example III, with each part being treated as described below.

Part A was heated an additional eight minutes at 325° F. after which it was combined and intimately mixed with 225 ml. of water and the resultant system was separated by filtration to give Filtrate A which also contained approximately 180 ml. of washings obtained from washing the insoluble residue with two 100 ml. portions of water.

Part B was heated to the upper temperature of 425° F. and held at this temperature for three minutes before being combined and intimately mixed with 225 ml. of ambient temperature water and the insolubles removed by filtration to give Filtrate B which also contained approximately 190 ml. of washings obtained from washing the insolubles with two 100 ml. portions of water.

Filtrate A was heated to 450° F. at which point it was combined with 200 ml. of water and the resulting system filtered to remove the insoluble organic matter formed and to recover the aqueous sulfuric acid filtrate which was again heated to 450° F., treated with 8 ml. of the aforedescribed nitric acid solution and then heated to 580° F. to give an end product after cooling and filtering that weighed 188.9 grams with its analysis showing a sulfuric acid content of 95.0% representing a recovery of 81.3% of the sulfuric acid in 225 grams of the sludge treated.

Filtrate B after being heated to a temperature of 450° F. was cooled to ambient temperature after which 8 ml. of the nitric acid solution were added followed by heating the filtrate with oxidant to a temperature of 580° F. to give a product after cooling and filtering that had a weight of 176.2 grams and a sulfuric acid content of 95.4% $H_2SO_4$ representing a recovery of 76.2% of the $H_2SO_4$ in the 225 grams of sludge treated.

In the process disclosed herein the use of selective temperature in the treatment of alkylation sludges achieves a series of desirable reactions which bring about the production of states of matter lending themselves to simple, easy, and inexpensive separations of unwanted organic and inorganic matter from the wanted sulfuric acid present in the sludge. Accordingly it may be seen that the advantages of the process are that it is extremely simple and requires neither elaborate equipment nor extreme accuracy. Moreover, corrosive action is minimized by use of relatively low operating temperatures which lowers the cost of processing equipment and consequently reduces maintenance costs. In addition, the physical state of the altered organic matter is such that it can be easily separated from the sulfuric acid quickly. The quantity of the recovered acid is comparable to present day commercial grades of similar concentration sulfuric acids. No complex manufacturing controls are required as simple visual observations of distinct phenomonen of the process are indicative of the reactions taking place.

It is to be understood that the foregoing is illustrative of the practice of the present invention and accordingly the scope of the invention is to be construed only with respect to the appended claims.

What is claimed as new is as follows:

1. A process for the recovery of sulfuric acid from alkylation sludges resulting from the use of sulfuric acid in a hydrocarbon refining process which comprises:
   (a) partially desiccating the sludge by heating to a temperature in the range of about 270° F. to about 325° F. and holding the sludge at such temperature until the sludge becomes a solid gelatinous mass to effect desulfation of alkyl hydrogen sulfates present in the sludge to enhance the formation of polymers by alkene hydrocarbons therefrom with the attendant liberation of sulfuric acid;
   (b) polymerizing alkenes liberated coincident with the formation of the gelatinous mass by continued heating of the gelatinous mass at a temperature in the range of about 325° F. to about 425° F. to form long chain and ring polymers and effect reaction of alkyl hydrogen sulfates to liberate additional sulfuric acid;
   (c) desulfating alkyl hydrogen sulfates present through hydrolysis thereof by the addition of an amount of water approximately equivalent to 0.5 to 1.0 part by weight of the alkylation sludge and heating of the sytem to a temperature in the range of about 385° F. to about 450° F. to liberate additional sulfuric acid while simultaneously driving off additional volatile contaminants;
   (d) separating the aqueous sulfuric acid solution from the insoluble portion and further heating the solution to effect further desulfation and polymerization of the desulfated, nonvolatile compounds to liberate additional sulfuric acid while simultaneously driving off volatile contaminants;
   (e) subjecting the generally pure aqueous solution of sulfuric acid obtained to the action of an oxidant while heating the solution to assure removal of oxidizable matter while simultaneously effecting concentration and further purification of the sulfuric acid by elimination of water and precipitation of inorganic contaminants from the aqueous system; and
   (f) separating the precipitate from the acid and recovering an organic matter-free sulfuric acid.

2. A process for the recovery of sulfuric acid from alkylation sludges resulting from the use of sulfuric acid in a hydrocarbon refining process which comprises:
   (a) partially desiccating the sludge by heating to a temperature in the range of about 270° F. to about 325° F. and holding the sludge in said temperature range until the sludge becomes a solid gelatinous mass to effect desulfation of alkyl hydrogen sulfates present in the sludge to enhance the formation of polymers by alkene hydrocarbons therefrom with the attendant liberation of sulfuric acid;
   (b) polymerizing alkenes liberated coincident with the formation of the gelatinous mass by continued heating of the gelatinous mass at a temperature in the range of about 325° F. to about 425° F. to form long chain and ring polymers and effect reaction of alkyl hydrogen sulfates to liberate additional sulfuric acid;
   (c) desulfating alkyl hydrogen sulfates present through hydrolysis thereof by the addition of an amount of water approximately equivalent to 0.5 to 1.0 part by weight of the alkylation sludge and heating of the system to a temperature in the range of about 385° F. to about 450° F. to liberate additional sulfuric acid while simultaneously driving off additional volatile contaminants;
   (d) separating the aqueous sulfuric acid solution from the insoluble portion and further heating the solution to a temperature in the range of about 400° F.

to about 600° F. to effect further desulfation and polymerization of the desulfated, non-volatile compounds to liberate additional sulfuric acid while simultaneously driving off volatile contaminants;

(e) subjecting the generally pure aqueous solution of sulfuric acid obtained to the action of an oxidant selected from the group consisting of nitric acid, hydrogen peroxide, hypochlorous acid and perchloric acid while heating the solution to assure removal of oxidizable matter while simultaneously effecting concentration and further purification of the sulfuric acid by elimination of water and precipitation of inorganic contaminants from the aqueous system; and (f) separating the precipitate from the acid and recovering an organic matter-free sulfuric acid.

3. A process for the recovery of sulfuric acid from alkylation sludges resulting from the use of sulfuric acid in a hydrocarbon refining process which comprises:

(a) partially desiccating the sludge by heating to a temperature of about 300° F. and holding the sludge at said temperature until the sludge becomes a solid gelatinous mass to effect desulfation of alkyl hydrogen sulfates present in the sludge to enhance the formation of polymers by alkene hydrocarbons produced therefrom with the attendant liberation of sulfuric acid;

(b) polymerizing alkenes liberated coincident with the formation of the gelatinous mass by continued heating of the gelatinous mass at a temperature in the range of about 425° F. to form long chain and ring polymers and effect reaction of alkyl hydrogen sulfates to liberate additional sulfuric acid;

(c) desulfating alkyl hydrogen sulfates present through hydrolysis thereof by the addition of an amount of water approximately equivalent to 0.5 to 1.0 part by weight of the alkylation sludge;

(d) separating the aqueous sulfuric acid solution from the insoluble portion and further heating the solution to a temperature of about 400° F. to effect further desulfation and polymerization of the desulfated, non-volatile compound to liberate additional sulfuric acid while simultaneously driving off volatile contaminants;

(e) subjecting the generally pure sulfuric acid obtained to the action of a minor proportion of nitric acid while heating the solution to a temperature of about 550° F. for a sufficient time to assure removal of oxidizable matter while simultaneously effecting concentration and further purification of the sulfuric acid by elimination of water and precipitation of inorganic contaminants from the aqueous system; and (f) separating the precipitate from the acid and recovering an organic matter-free sulfuric acid.

4. A process for the recovery of sulfuric acid from alkylation sludges resulting from the use of sulfuric acid in a hydrocarbon refining process which comprises:

(a) partially desiccating the sludge by heating to a temperature of about 310° F. and holding the sludge at said temperature until the sludge becomes a solid gelatinous mass to effect desulfation of alkyl hydrogen sulfates present in the sludge to enhance the formation of polymers by alkene hydrocarbons produced therefrom with the attendant liberation of sulfuric acid;

(b) polymerizing alkenes liberated coincident with the formation of the gelatinous mass by continued heating of the gelatinous mass at a temperature of about 325° F. to form long chain and ring polymers and effect reaction of alkyl hydrogen sulfates to liberate additional sulfuric acid;

(c) desulfating alkyl hydrogen sulfates present through hydrolysis thereof by the addition of an amount of water approximately equivalent to 0.5 to 1.0 part by weight of the alkylation sludge to liberate sulfuric acid;

(d) separating the aqueous sulfuric acid solution from the insoluble portion and further heating the solution to a temperature of about 385° F. to effect further desulfation and polymerization of the desulfated, non-volatile compounds to liberate additional sulfuric acid while simultaneously driving off volatile contaminants;

(e) subjecting the generally pure sulfuric acid obtained to the action of a minor proportion of hydrogen peroxide while heating the solution to a temperature of about 400° F. for a sufficient time to assure removal of oxidizable matter while simultaneously effecting concentration and further purification of the sulfuric acid by elimination of water and precipitation of inorganic contaminants from the aqueous system; and (f) separating the precipitate from the acid and recovering an organic matter-free sulfuric acid.

References Cited

UNITED STATES PATENTS

| | | | |
|---|---|---|---|
| 2,313,910 | 3/1943 | Archibald | 23—173 |
| 2,418,210 | 4/1947 | Wilde | 23—173 |
| 2,463,204 | 3/1949 | Reich | 23—173 |

OSCAR R. VERTIZ, Primary Examiner

G. T. OZAKI, Assistant Examiner

U.S. Cl. X.R.

208—13